US009469792B2

(12) United States Patent
Mclennan

(10) Patent No.: US 9,469,792 B2
(45) Date of Patent: Oct. 18, 2016

(54) LOW FORMALDEHYDE VINYL ESTER/ETHYLENE COPOLYMER DISPERSIONS FOR USE IN ADHESIVES

(75) Inventor: Alistair Mclennan, Königstein (DE)

(73) Assignee: CELANESE SALES GERMANY GMBH, Sulzbach (DE)

( * ) Notice: Subject to any disclaimer, the term of this patent is extended or adjusted under 35 U.S.C. 154(b) by 137 days.

(21) Appl. No.: 14/236,231

(22) PCT Filed: Aug. 5, 2011

(86) PCT No.: PCT/IB2011/002662

§ 371 (c)(1),
(2), (4) Date: Jan. 30, 2014

(87) PCT Pub. No.: WO2013/021234

PCT Pub. Date: Feb. 14, 2013

(65) Prior Publication Data

US 2014/0171574 A1    Jun. 19, 2014

(51) Int. Cl.
| | |
|---|---|
| *C09J 129/04* | (2006.01) |
| *C09J 123/08* | (2006.01) |
| *C09J 131/04* | (2006.01) |
| *C08L 23/08* | (2006.01) |
| *C08F 218/08* | (2006.01) |
| *C09J 133/08* | (2006.01) |
| *C08F 210/02* | (2006.01) |

(52) U.S. Cl.
CPC ............ *C09J 129/04* (2013.01); *C08F 218/08* (2013.01); *C08L 23/0846* (2013.01); *C09J 123/0846* (2013.01); *C09J 131/04* (2013.01); *C09J 133/08* (2013.01); *C08F 210/02* (2013.01)

(58) Field of Classification Search
CPC .... C09J 129/04; C09J 133/08; C09J 131/04; C09J 123/0846; C08F 218/08; C08F 210/02; C08L 23/0846
See application file for complete search history.

(56) References Cited

U.S. PATENT DOCUMENTS

| | | | |
|---|---|---|---|
| 4,472,165 A | 9/1984 | Gregorian et al. | |
| 4,525,492 A | 6/1985 | Rastall et al. | |
| 5,021,529 A | 6/1991 | Garrett | |
| 5,084,503 A * | 1/1992 | Iacoviello | 524/459 |
| 5,143,954 A | 9/1992 | Hutton et al. | |
| 5,354,803 A | 10/1994 | Dragner et al. | |
| 5,540,987 A | 7/1996 | Mudge et al. | |
| 6,211,400 B1 | 4/2001 | Berghofer et al. | |
| 6,576,698 B1 | 6/2003 | Weitzel | |
| 6,586,622 B2 | 7/2003 | Berghofer et al. | |
| 6,635,725 B1 | 10/2003 | Sata | |
| 6,696,519 B2 | 2/2004 | Brown et al. | |
| 6,787,594 B1 | 9/2004 | Goldstein et al. | |
| 2002/0068791 A1* | 6/2002 | Brown et al. | 524/804 |
| 2003/0125451 A1* | 7/2003 | Weitzel et al. | 524/503 |
| 2006/0229369 A1 | 10/2006 | Frank et al. | |
| 2007/0088120 A1 | 4/2007 | Zecha et al. | |
| 2008/0039572 A1* | 2/2008 | Mueller et al. | 524/457 |
| 2010/0027370 A1* | 2/2010 | Magnin et al. | 366/101 |
| 2012/0316282 A1* | 12/2012 | Schulte et al. | 524/503 |

FOREIGN PATENT DOCUMENTS

| | | |
|---|---|---|
| EP | 0488605 A2 | 6/1992 |
| EP | 0546576 A1 | 6/1993 |
| EP | 0596318 A2 | 5/1994 |
| EP | 0647658 A2 | 4/1995 |
| WO | 2008145489 A1 | 12/2008 |

OTHER PUBLICATIONS

Bergh et al; Formation of formaldehyde and peroxides by air oxidation of high purity polyoxyethylene surfactants; Contact Dermatitis, vol. 39, pp. 14-20 (1998).
International Search Report and Written Opinion issued in corresponding PCT/IB2011/002662 on May 10, 2012.

* cited by examiner

*Primary Examiner* — Robert Jones, Jr.
(74) *Attorney, Agent, or Firm* — Roberts Mlotkowski Safran Cole & Calderon P.C.

(57) ABSTRACT

Disclosed are low-formaldehyde aqueous dispersions of vinyl ester/ethylene, e.g., vinyl acetate/ethylene (VAE), copolymers suitable for use in adhesives for applications such as tobacco or food products wherein only very low levels of formaldehyde are permitted. Such dispersions are prepared by emulsion copolymerization of a monomer mixture comprising a vinyl ester, ethylene, a stabilizing system comprising polyvinyl alcohol preferably having a degree of hydrolysis of at least 97 mole %, and a selected type of free radical redox polymerization initiator system. This selected redox initiator system comprises both a water-insoluble oxidizing agent and a sulfuric acid-based reducing agent. The monomer mixture which is polymerized is substantially free of co-monomers which yield free formaldehyde upon drying or curing of the dispersion and is also substantially free of ethylene oxide-containing emulsifiers. The aqueous dispersions resulting from polymerization of this monomer mixture has a solids content in weight percent and a Brookfield viscosity in millipascal-seconds such that the ratio of solids content to the natural logarithm of viscosity ranges from about 6.34 to about 8.25 wt %/ln(mPa·s). The dispersions herein also have a formaldehyde content of less than about 5.0 ppmw as determined by ISO-15173.

22 Claims, No Drawings

LOW FORMALDEHYDE VINYL ESTER/ETHYLENE COPOLYMER DISPERSIONS FOR USE IN ADHESIVES

CROSS-REFERENCE TO RELATED APPLICATIONS

The present Application is a U.S. National Phase of international patent application PCT/US2011/002662 filed on Aug. 5, 2011. The disclosure of the international application PCT/US2011/002662 is hereby incorporated by reference into the present Application.

FIELD

The present development relates to the preparation of aqueous dispersions of vinyl ester/ethylene copolymers, for example vinyl acetate/ethylene (VAE) emulsion copolymers. Such dispersions contain very low levels of formaldehyde and are therefore useful in preparing adhesives for applications, such as in tobacco products or for food products, in which only extremely small amounts of formaldehyde are permitted.

BACKGROUND

Aqueous dispersions containing copolymers of vinyl esters and ethylene are well known for the production of adhesives for use in the wood, paper and packaging industries. Emulsion copolymers of vinyl acetate and ethylene, i.e., VAE copolymer emulsions, are especially useful as the binder component in such adhesive products.

One application where VAE-based emulsion copolymers find utility is in the area of adhesives for tobacco products and tobacco product packaging. Such adhesives, for example, are frequently used as a sideseam adhesive to secure cigarette paper around the tobacco rod in cigarettes. These adhesives can also be used in "tipping" applications wherein the adhesive secures a filter, holder or other type of tip to one end of the cigarette. VAE-based adhesives are desirable for such applications because of their good adhesion, wet tack and shear resistance properties. VAE emulsions used in adhesive formulations also have very low odor characteristics such that their use in cigarettes and cigarette packaging does not interfere with the cigarette smell or taste.

Industry standards and in some instances government regulations require that the emulsion copolymers in tobacco product or food product adhesives be very low in residual monomer content and content of volatile organic compounds (VOCs). One adhesive component which is frequently singled out for specific control and minimization is formaldehyde. This is because formaldehyde can be produced by decomposition or disassociation of some components which are conventionally used in emulsion polymerization procedures.

Formaldehyde-generating components can include, for example, commonly employed self cross-linking co-monomers such as N-methylolacrylamide used in the copolymers which are prepared. Free formaldehyde can also be released by certain reducing agents such as sodium formaldehyde sulfoxylate used in the polymerization initiator systems employed. Certain emulsion stabilizers used, including, for instance, some types of ethylene oxide-containing surfactants can also form formaldehyde upon oxidation. Formaldehyde formation from polyoxyethylene nonionic surfactants is described, for example, in Bergh et al; *Contact Dermatitis, Vol.* 39, pp. 14-20 (1998).

One method for reducing the free formaldehyde content of copolymer emulsions having formaldehyde produced from materials used in the polymerization process is to introduce a formaldehyde binding or scavenging agent. U.S. Pat. Nos. 4,472,165; 4,525,492 and 5,143,954 and European Patent No. 647658B disclose the use of urea, amines and numerous derivatives of such materials as formaldehyde binders or scavengers in various resin products. Commercially available products, such as Celvolit® 149 LV marketed by Celanese, use urea as a formaldehyde scavenger.

Another approach to overcoming or ameliorating the effects of free formaldehyde released by N-methylol-based self-crosslinking co-monomers in emulsion copolymer dispersions focuses on the redox initiator systems used to prepare such dispersions. In particular, formaldehyde-generating reducing agents in such redox systems can be replaced with other types of reducing agents which do not generate formaldehyde. U.S. Pat. No. 5,540,987, for example, discloses a redox initiator system for vinyl acetate/N-methylol crosslinking co-monomer emulsion binders, which initiator system reduces free formaldehyde content of the resulting copolymer emulsion. The redox system of the '987 patent comprises a hydrophobic hydroperoxide oxidizing agent in combination with an ascorbic acid or derivative thereof as a reducing agent.

Similar technology is also disclosed in U.S. Pat. No. 6,787,594. The '594 patent describes reduced formaldehyde nonwoven binders based on emulsifier-stabilized vinyl acetate/ethylene emulsion copolymers. Such copolymers also contain an N-methylol-based crosslinking co-monomer. Formaldehyde reduction in the binders of the '594 patent is provided by using a selected type of initiator system during polymerization of the emulsion copolymer. In particular, the selected type of initiator system disclosed in the '594 patent is a redox system comprising an oxidizing agent, such as a hydrophobic peroxide, and a reducing agent which is a glycol adduct of sodium sulfite. Particularly preferred reducing agents are said to be sulfinic acid compounds such as 2-hydroxy-2-sulfinato-acetic acid-disodium salt. Reducing agents of this preferred type are sold, for example, under the tradename Bruggolite® FF-6.

Another reference which discloses preparation of emulsion polymers using a similar initiator system, and generally also using emulsifiers as stabilizing agents, is U.S. Pat. No. 6,696,519. The '519 patent utilizes a redox initiator system comprising a water-soluble oxidizing agent, a water-insoluble oxidizing agent and a reducing agent derived from sulfinic acid. The '519 patent is concerned with reducing residual monomer levels in the resulting emulsion and does not mention preparation of low formaldehyde emulsion polymers.

Notwithstanding the foregoing prior art dealing with emulsion polymers and copolymers of low formaldehyde content and emulsion polymers prepared using selected types of oxidizing and reducing agents in a redox initiator system, it would be advantageous to identify still other emulsion copolymer dispersions (and preparation processes for such dispersions) which can be used in adhesives requiring very low formaldehyde levels.

SUMMARY

In one aspect, the present development is directed to an aqueous dispersion of a vinyl ester/ethylene copolymer having a very low formaldehyde content of less than about 5.0 ppmw as determined by ISO-15173. Such an aqueous dispersion is prepared by emulsion copolymerization of a monomer mixture comprising a vinyl ester such as vinyl acetate, ethylene, a polyvinyl alcohol-based stabilizing system and a free radical redox polymerization initiator system. The stabilizing system for the monomer mixture preferably comprises polyvinyl alcohol having a degree of hydrolysis of at least about 97 mole %. The redox polymerization initiator system in the monomer mixture comprises both a water-insoluble oxidizing agent and a sulfinic acid-based reducing agent. The monomer mixture is also substantially free of co-monomers which yield free formaldehyde upon drying or curing of aqueous dispersion and is also substantially free of ethylene oxide-containing emulsifiers. The aqueous dispersion resulting from polymerization of the monomer mixture has a solids content in weight percent and a Brookfield viscosity in millipascal-seconds such that the ratio of solids content to the natural logarithm of viscosity ranges from about 6.34 to about 8.25 wt %/ln(mPa·s).

In another aspect, the present development is directed to adhesive compositions which comprise the aqueous emulsion copolymer dispersions as hereinbefore described. By virtue of the very low formaldehyde content in the dispersions used, such adhesives find utility for applications, such as for tobacco products, i.e., cigarettes, and tobacco packaging, or for use in direct or indirect contact with food, wherein little or no formaldehyde can be present.

DETAILED DESCRIPTION

The aqueous dispersions of emulsion copolymers described herein are prepared by emulsion polymerization of a selected type of monomer mixture. The monomers employed in such a mixture along with the stabilizer and redox initiator systems used, polymerization conditions and characteristics of and uses for the aqueous dispersions formed are all described in detail as follows:

Essential Co-Monomers

The aqueous dispersions herein essentially comprise a vinyl ester/ethylene copolymer. The vinyl ester(s) employed is/are generally vinyl ester(s) of a saturated carboxylic acid having 1 to 13, typically 2 to 8, carbon atoms, especially vinyl acetate. The vinyl ester component is typically present in the copolymer in an amount between about 75 wt % and about 95 wt % based on the total weight of monomers. More preferably, the vinyl ester will be vinyl acetate which will comprise from about 80 wt % to about 90 wt % of the copolymer, based on total weight of monomers. The ethylene component is generally present in the copolymer in an amount from about 5 wt % to about 25 wt %, such as from about 10 wt % to about 20 wt %, for example from about 12 wt % to about 18 wt %, of the total monomer weight.

Optional Co-Monomers

In addition to a vinyl ester and ethylene, the monomer mixture may optionally include one or more additional functional monomers added to improve the properties of the final copolymer dispersion. Such optionally present, functional co-monomers can include ethylenically unsaturated acids, e.g. mono- or di-carboxylic acids, sulfonic acids or phosphonic acids. In place of the free acids, it is also possible to use their salts, preferably alkali metal salts or ammonium salts. Examples of optional functional co-monomers of this type include acrylic acid, methacrylic acid, crotonic acid, maleic acid, fumaric acid, itaconic acid, vinylsulfonic acid, vinylphosphonic acid, styrenesulfonic acid, monoesters of maleic and/or fumaric acid, and of itaconic acid, with monohydric aliphatic saturated alcohols of chain length $C_1$-$C_{18}$, and also their alkali metal salts and ammonium salts, or (meth)acrylic esters of sulfoalkanols, an example being sodium 2-sulfoethyl methacrylate.

Other types of suitable optional functional co-monomers include ethylenically unsaturated co-monomers with at least one amide-, epoxy-, hydroxyl, trialkoxysilane- or carbonyl group. Particularly suitable are ethylenically unsaturated epoxide compounds, such as glycidyl methacrylate or glycidyl acrylate. Also suitable are hydroxyl compounds including methacrylic acid and acrylic acid $C_1$-$C_9$ hydroxyalkyl esters, such as n-hydroxyethyl, n-hydroxypropyl or n-hydroxybutyl acrylate and methacrylate. Other suitable functional co-monomers include compounds such as diacetone acrylamide and acetylacetoxyethyl acrylate and methacrylate; and amides of ethylenically unsaturated carboxylic acids, such as acrylamide or meth acrylamide.

One type of functional co-monomer which should not be incorporated into the vinyl acetate/ethylene copolymers of the aqueous dispersions herein comprises any co-monomer which contains cross-linkable moieties that generate formaldehyde upon drying or curing of the dispersions or adhesive products containing such copolymers. Thus the vinyl acetate/ethylene copolymer in the copolymer dispersion should be substantially free of such co-monomers, which include, for example, common cross-linkers like N-methylolacrylamide (NMA) or even low formaldehyde versions of N-methylolacrylamide such as NMA-LF.

Optional functional co-monomers can be incorporated into the vinyl ester/ethylene emulsion copolymers of the aqueous dispersions herein in amount of up to about 5 wt %, based on total main co-monomers in the copolymer. More preferably, optional functional co-monomers can comprise from about 0.5 wt % to about 2 wt %, based on total main co-monomers in the copolymer.

Emulsion Stabilizing System

The selected type of stabilizing system employed to stabilize the aqueous emulsions of monomers which are polymerized and the aqueous copolymer dispersions which are formed thereby is one based on polyvinyl alcohol. One type of polyvinyl alcohol which is preferably present in the stabilizing system used to prepare the aqueous copolymer dispersions herein is one which has a degree of hydrolysis of at least about 97 mole %. More preferably, at least some of the polyvinyl alcohol used in the stabilizing system will have a degree of hydrolysis of at least about 98 mole %.

One example of a commercially available polyvinyl alcohol having a degree of hydrolysis of at least about 97 mole % is Celvol 107 supplied by Sekisui Chemical Company Ltd. Celvol 107 has a degree of hydrolysis of about 98.0 to about 98.8 mole % and a Hoppler viscosity at 4% concentration in water of from about 5.5 to about 6.6 mPa·s at 25° C. Hoppler viscosity at 4% concentration is used as an indication of the relative molecular weight of the polyvinyl alcohol material.

In a preferred embodiment, the highly hydrated polyvinyl alcohol as hereinbefore described is utilized in the stabilizing system as a first polyvinyl alcohol component in combination with a second polyvinyl alcohol component comprising PVOH having a lower degree of hydrolysis. In such a preferred combination of first and second polyvinyl alcohol components, the PVOH in the second polyvinyl alcohol component will have a degree of hydrolysis ranging from about 85 mole % to about 90 mole %. When this combination is used, the stabilizing system can comprise (a) from about 0.25 to about 3 wt % based on the total monomer weight of the first polyvinyl alcohol component having a degree of hydrolysis of at least about 97 mole %, and (b) from about 1 to about 5 wt % based on the total monomer weight of the second polyvinyl alcohol component having a degree of hydrolysis of about 85 to about 90 mole %.

Polyvinyl alcohols having the lower degree of hydrolysis of the second polyvinyl alcohol component are also commercially available. One example of commercially available polyvinyl alcohol having such a lower degree of hydrolysis is Celvol 523, again supplied by Sekisui Chemical Company Ltd. Celvol 523 has a degree of hydrolysis of about 87-89 mole % and a Hoppler viscosity at 4% of from about 23 to 27 mPa·s at 25° C. This corresponds to a weight average molecular weight for Celvol 523 of at least 85,000 g/mol. Another commercially available polyvinyl alcohol of the lower degree of hydrolysis type is Celvol 205, also supplied by Sekisui Chemical Company Ltd. Celvol 205 also has a degree of hydrolysis of about 87-89 mole % but a Hoppler viscosity at 4% of from about 5.2 to 6.2 mPa·s at 25° C. This corresponds to a weight average molecular weight for Celvol 205 of about 30,000 to about 50,000 g/mol which is about the same as the molecular weight for Celvol 107, the highly hydrolyzed PVOH.

Blends of relatively lower molecular weight PVOH, for example Celvol 205, and relatively higher molecular weight PVOH, for example Celvol 523, can be used to form the second polyvinyl alcohol component having same the lower degree of hydrolysis. The ratio of these two Celvol polyvinyl alcohols having the same lower degree of hydrolysis (85-90 mole %) but differing molecular weights can be adjusted as desired to control the viscosity of the emulsion being PVOH-stabilized. Of course, other combinations of Celvol materials, for example Celvol 203 or Celvol 504 in combination with Celvol 530, can be used, or even Celvol 508 with Celvol 523.

In another preferred embodiment, the stabilizing system will comprise a combination of a first PVOH component having a degree of hydrolysis of at least about 97 mole percent and a second PVOH component comprising a blend of two different PVOH materials, each having a degree of hydrolysis of from about 85 to 90 mole percent. In such a preferred embodiment, the highly hydrolyzed first PVOH component will have a Hoppler viscosity at 4% concentration of from about 3.0 to about 11.0 mPa·s. The first PVOH material in the blend forming the less hydrolyzed second PVOH component will have a Hoppler viscosity at 4% concentration of from about 3.0 to about 10.0 mPa·s and the second PVOH material of this blend will have a Hoppler viscosity at 4% concentration of from about 20 to about 36 mPa·s The PVOH-stabilized aqueous monomer mixtures and aqueous dispersions of emulsion copolymers formed therefrom should be substantially free of conventional ethylene oxide-containing emulsifiers. Such emulsifiers, and especially those of the nonionic polyoxyethylene type, can produce formaldehyde upon being subjected to the polymerization and curing conditions encountered during preparation and use of the aqueous dispersions herein. Accordingly, such ethylene oxide-containing emulsifier materials are avoided to ensure that the aqueous dispersions herein have very low formaldehyde content. The aqueous dispersions herein are considered to be substantially free of ethylene oxide-containing emulsifiers if no more than 0.5 ppmw of such emulsifiers are present.

Redox Initiator System

The monomer mixtures which are polymerized to form the aqueous copolymer dispersions herein will also contain a selected type of redox initiator system to facilitate the polymerization reaction. Such an initiator system will comprise a water-insoluble oxidizing agent and a sulfinic acid, or salts thereof, as a reducing agent.

Typically, from about 0.01% to about 2.0%, preferably from about 0.02% to about 1.0%, more preferably from about 0.025% to about 0.5%, by weight based on total weight of co-monomers, of a water-insoluble oxidizing agent is used in the redox initiator system. By "water-insoluble oxidizing agent" herein is meant an oxidizing agent which has a water solubility of less than 20% by weight in water at 25° C.

Suitable water-insoluble oxidizing agents include, for example, benzoyl peroxide, lauryl peroxide, t-butyl peroxide, t-butyl hydroperoxide, 2,2'-azobisisobutyronitrile, t-amyl hydroperoxide, t-butyl peroxyneodecanoate, and t-butyl peroxypivalate. The most preferred water-insoluble oxidizing agent for use in the initiator systems herein is t-butyl hydroperoxide.

The redox polymerization initiator systems herein may also optionally comprise a conventional water-soluble oxidizing agent. Suitable water-soluble oxidizing agents include, for example, hydrogen peroxide and the ammonium or alkali metal persulfates, perborates, peracetates, peroxides, and percarbonates.

The redox initiator systems used herein will also comprise a reducing agent based on one or more sulfinic acids, or salts thereof. Sulfinic acid derivatives including the glycolic acid adducts of sulfinic acid are suitable reducing agents for use herein, Typically such reducing agents are used at levels of from about 0.01% to about 2.0%, preferably from about 0.02% to about 1.0%, more preferably from about 0.025% to about 0.5%, based on total weight of co-monomers. Specific examples of suitable sulfinic acid-based reducing agents include hydroxyphenyl hydroxymethyl sulfinic acid-sodium salt; 4-methoxyphenyl hydroxymethyl sulfinic acid-sodium salt; 2-hydroxy-2-sulfinato acetic acid-disodium salt; 2-hydroxy-2-sulfinato acetic acid-zinc salt; 2-hydroxy-2-sulfinato propionate-disodium salt; ethyl 2-hydroxy-2-sulfinato propionate-sodium salt and combinations of such reducing agents.

The reducing agent can further comprise at least one sulfonic acid compound which corresponds to sulfinic acid-based compound(s) used, with or without the corresponding sulfite also being present as part of the reducing agent. An especially preferred reducing agent of this type comprises a combination of 2-hydroxy-2-sulfinato acetic acid-disodium salt and 2-hydroxy-2-sulfonato acetic acid-disodium salt, with or without sodium sulfite. Reducing agents of this type are commercially available under the tradenames Bruggolite® FF6 and FF7 from L. Brüggemann KG. Such reducing agents are more fully described in U.S. Pat. Nos. 6,211,400; 6,586,622 and 6,787,594, all of which patents are incorporated herein by reference.

The redox initiator systems used herein can also optionally comprise catalyzing metal salts of iron, copper, manganese, silver, platinum, vanadium, nickel, chromium, palladium, or cobalt. These catalyzing salts may be used at levels of from about 0.01 to about 25 ppm, with or without metal complexing agents. Preferably iron or copper may be used.

Polymerization Procedures and Conditions

The PVOH-stabilized copolymer dispersions described herein can be prepared using emulsion polymerization procedures which result in the preparation of polymer dispersions in aqueous latex form. Such preparation of aqueous polymer dispersions of this type is well known and has already been described in numerous instances and is therefore known to the skilled artisan. Such procedures are described, for example, in U.S. Pat. No. 5,633,334, and in the *Encyclopedia of Polymer Science and Engineering*, Vol. 8, p. 659 ff (1987). The disclosures of both of these publications are incorporated herein by reference in their entirety.

The polymerization may be carried out in any manner known per se in one, two or more stages with different monomer combinations, giving polymer dispersions having particles with homogeneous or heterogeneous, e.g., core shell or hemispheres, morphology. Any reactor system such as batch, loop, continuous, cascade, etc, may be employed.

The polymerization temperature generally ranges from about 20° C. to about 150° C., more preferably from about 50° C. to about 120° C. The polymerization generally takes place under pressure if appropriate, preferably from about 2 to about 150 bar, more preferably from about 5 to about 100 bar.

In a typical polymerization procedure involving, for example, vinyl acetate/ethylene copolymer dispersions, the vinyl acetate, ethylene, stabilizing system and other co-monomers can be polymerized in an aqueous medium under pressures up to about 120 bar in the presence of one or more initiators. The aqueous reaction mixture in the polymerization vessel can be maintained by a suitable buffering agent at a pH of about 2 to about 7.

The manner of combining the several polymerization ingredients, i.e., stabilizing system, co-monomers, initiator system components, etc., can vary widely. Generally an aqueous medium containing at least part of the stabilizing system can be initially formed in a polymerization vessel with the various other polymerization ingredients being added to the vessel thereafter.

Co-monomers can be added to the polymerization vessel continuously, incrementally or as a single charge addition of the entire amounts of co-monomers to be used. Co-monomers can be employed as pure monomers or can be used in the form of a pre-mixed emulsion. Ethylene as a co-monomer can be pumped into the polymerization vessel and maintained under appropriate pressure therein.

It is possible for the total amount of redox initiator system to be included in the initial charge to the reactor at the beginning of the polymerization. Preferably, however, a portion of the initiator is included in the initial charge at the beginning, and the remainder is added after the polymerization has been initiated, in one or more steps or continuously. It is also possible to start the emulsion polymerization using a seed latex, for example with about 0.5 to about 15% by weight of the polymerization mixture.

Dispersion Characteristics

The aqueous copolymer dispersions as prepared herein will generally have a viscosities of at least about 500 mPa·s at 55% solids and 25° C., as measured with a Brookfield viscometer at 20 rpm, with spindle 3. Preferably, viscosity so measured will range from about 1000 to about 5000 mPa·s, more preferably from about 1500 to about 3000 mPa·s. Viscosity may be adjusted by the addition of thickeners and/or water to the copolymer dispersion. Suitable thickeners can include polyacrylates or polyurethanes, such as Borchigel L75® and Tafigel PUR 60®. Alternatively, the copolymer dispersion may be substantially free of thickeners.

Following polymerization, the solids content of the resulting aqueous copolymer dispersions can be adjusted to the level desired by the addition of water or by the removal of water by distillation. Generally, the desired level of polymeric solids content after polymerization is from about 40 wt % to about 70 wt % based on the total weight of the polymer dispersion, more preferably from about 45 wt % to about 60 wt %, most preferably from about 54 wt % to about 57 wt %, or even from about 54.5 wt % to about 56.5 wt %. The polymeric solids in the dispersion will generally have an average particle size ranging from about 0.5 μm to about 5 μm. (Particle size can be measured using a Malvern Mastersizer.)

The aqueous copolymer dispersions herein will also have a selected relationship between solids content and viscosity. In particular, the ratio of the dispersion solids content (in weight percent) to the natural logarithm of the dispersion Brookfield viscosity (in millipascal-seconds) will range from about 6.34 to about 8.25 wt %/ln(mPa·s). More preferably this ratio of the solids content to the natural logarithm of the viscosity will range from about 6.69 to about 7.81 wt %/ln(mPa·s), most preferably from about 6.93 to about 7.66 wt %/ln(mPa·s).

The aqueous copolymer dispersions herein will be very low in formaldehyde content and thus appropriate for formulation into adhesive products suitable for uses that require formaldehyde-free products or at least products which are very low in measurable formaldehyde. Formaldehyde content can be determined using Test Method ISO-15173 described in greater detail in the Test Methods section hereinafter. An alternative method of measuring formaldehyde content is the Test Method YC/T332-2010 of the Tobacco Industry Standard of the Peoples' Republic of China for Determination of Formaldehyde in Water-Bourne Adhesives for Cigarette by HPLC. This test too is described hereinafter in the Test Methods section.

The aqueous dispersions herein will generally have a formaldehyde content as determined using ISO-15173 of less than about 5.0 ppm by weight, and more preferably less than about 0.9 ppmw. Most preferably, the formaldehyde content of the aqueous dispersions herein will be about 0.5 ppmw or less when determined in accordance with such testing. When using the YC/T332-2010 test method, the formaldehyde content of the aqueous dispersions herein will be less than about 10 ppm, more preferably about 5.0 ppm or less.

Adhesive Formulation

When formulated into general purpose adhesives, the aqueous vinyl ester/ethylene copolymer dispersions described herein may be combined with additives which are typical for use in the production of dispersion-based adhesives. Suitable additives include, for example, film-forming assistants, such as white spirit, Texanol®, TxiB®, butyl glycol, butyldiglycol, butyldipropylene glycol, and butyltripropylene glycol, toluene; plasticizers, such as dimethyl phthalate, dibutyl phthalate, diisobutyl phthalate, diisobutyl adipate, Coasol B®, Plastilit 3060®, and Triazetin®; wetting agents, such as AMP 90®, TegoWet.280®, Fluowet PE®; thickeners, such as polyacrylates or polyurethanes, such as Borchigel L759® and Tafigel PUR 60®; defoamers, such as mineral oil defoamers or silicone defoamers; UV protectants, such as Tinuvin 1130®, subsequently added stabilizing polymers, such as polyvinyl alcohol or cellulose ethers, and other additives and auxiliaries of the kind typical for the formulation of adhesives.

The fraction of the foregoing additives in the final dispersion-based adhesive can be up to 25% by weight, preferably 2% to 15% by weight, and in particular 5% to 10% by weight, based on the dispersion. When the dispersions herein are formulated into adhesives for use in or with tobacco or food products, such adhesives are generally formulated only with additional PVOH and no additional solvents, plasticizers or mineral oils.

Examples of suitable substrates that can be bonded using the present low formaldehyde adhesives include paper, metals, plastics, paint surfaces, textiles, nonwovens or natural substances, such as wood. The substrates to be bonded may possess absorbent surfaces or hydrophobic surfaces. Examples of absorbent surfaces are papers, including paperboard and cardboard, and other fiber webs. Examples of hydrophobic surfaces are polymeric films (e.g., polyester film, polyolefin film such as polypropylene or polyethylene, for example, polystyrene film, acetate film) or papers with a UV varnish coating. As noted, the preferred utility for the adhesive products herein is for cigarettes (cigarette paper side seams and cigarette tipping), for cigarette packaging and for direct or indirect contact with food, by virtue of the very low formaldehyde content which is required of such adhesives.

EXAMPLES

The invention will now be more particularly described with reference to the following non-limiting Examples.
Test Methods
Solids Content
Solids content is measured by drying 1 to 2 grams of the aqueous dispersion at 105° C. for 4 hours, and by then dividing the weight of dried polymer by the weight of dispersion.
Viscosity
Unless otherwise indicated, viscosity is determined at 25° C. using a Brookfield DV-I+Viscometer, with spindle 3, speed 20 rpm.
Grit
Grit is determined by filtering 100 grams of dispersion through a 40μ filter, drying and weighing the dried grit. This is expressed as a % on the wet dispersion. When the viscosity of the dispersion is high, the dispersion is first diluted with 100 g of water.
Glass Transition Temperature
Determination of the Glass Transition Temperature, ($T_g$), is according to ASTM E 1356 by Differential Scanning Calorimetry, (DSC), using a Mettler DSC 820 with a fluid $N_2$ cooling system. The tested range is from −80° C. to 130° C. with a heating rate of 10° C./min. The onset of the $T_g$ is the value which is reported.
Formaldehyde Content—Method 1
Formaldehyde content can be determined in accordance with the procedures of ISO-15173 for measuring the amount of free formaldehyde in polymer dispersions. The aqueous phase of the dispersion is separated by centrifugation, and then the free formaldehyde is complexed by reacting with acetyl acetone, (Nash reagent). The resulting complex is then analyzed by HPLC with a UV detector.
Formaldehyde Content—Method 2
Formaldehyde content can also be determined in accordance with the procedures of Test No. YC/T332-2010, of the Tobacco Industry Standard of The People's Republic Of China for Determination of Formaldehyde in Water-Borne Adhesives for Cigarette by HPLC. The aqueous phase is separated by centrifugation and then the free formaldehyde is complexed by reacting with 2,4-dinitrophenylhydrazine. The resulting complex is then analyzed by HPLC with a diode array detector.
Heat Resistance of Adhesive
A 75μ thick wet film of the dispersion is applied on a sheet of 80 g/m² white paper using a bird bar. A second sheet is immediately laminated on top using a 2 kg roller and dried for 24 hours, leaving unglued edges. Then 2.5 cm test strips are cut from the sheet and placed horizontally in an oven with the upper unglued edge clamped and a 200 g weight hung from the other edge. The oven is heated at a rate of 5° C./30 min until the adhesive no longer holds the sheets together and the weight drops down. This temperature is reported as the heat resistance.
Setting Speed
A 50μ thick wet film of the dispersion is drawn down on a piece of card on which is marked a cm scale using a bird bar. A sheet of paper is immediately laminated on top using a 2 kg roller and then peeled off at a constant speed of 1 cm/sec. The setting speed corresponds to the distance at which fiber tear can clearly be seen.
Yellowing
An amount of the test emulsion is dried in a circular dish (approximately 3 cm in diameter) for 7 days at room temperature to produce a film approximately 3 mm in thickness. The dry film is heated for 8 minutes in an oven at 180° C. and the color compared with that of Comparative Example 6 (Celvolit 149LV) hereinafter, which gives an off-white color. Better=whiter, worse=more yellow.

Example 1

Preparation of a Vinyl Acetate/Ethylene Copolymer Dispersion

VA/E Weight Ratio=84.14/15.86
PVOH Stabilizer=Celvol 205 (1.5 pphm)/Celvol 523 (1.5 pphm)/Celvol 107 (1.0 pphm)

An aqueous solution is prepared by the addition of 1.96 g of anhydrous sodium acetate, 387.4 g of a 20% aqueous solution of polyvinyl alcohol having a hydrolysis degree of 87-89% and a Hoppler viscosity at 4% concentration of 5.2 to 6.2 mPa·s at 25° C., (Celvol 205); 516.5 g of a 15% aqueous solution of polyvinyl alcohol having a hydrolysis degree of 87-89% and a Hoppler viscosity at 4% concentration 23 to 27 mPa·s at 25° C., (Celvol 523); 258.3 g of a 20% aqueous solution of polyvinyl alcohol, having a hydrolysis degree of 98.0-98.8% and a Hoppler viscosity at 4% concentration of 5.5 to 6.6 mPa·s at 25° C., (Celvol 107); 7.2 g of a 30% active solution of a polyacrylate dispersant, (Orotan 850 ER-LO); and 2.22 g of a defoamer, (Rhodoline 6575 GM), to 2551.6 g of deionized water while stirring. A 4% active solution (2.6 g) of ferric chloride is added, and the pH is then adjusted to pH 4.4 by the use of phosphoric acid. This aqueous solution is then charged to a 10-liter pressure reactor equipped with a stirrer, dosage pumps and a mass flow meter for dosing ethylene. The reactor is degassed by twice evacuating, then pressurizing with nitrogen to 2 bar, and by then finally evacuating. The stirrer is set to 300 rpm.

The reactor is heated to 40° C., and 3042.1 g of vinyl acetate is pumped to the reactor. When 50% of the vinyl acetate has been added, the stirrer speed is increased to 600 rpm. Then 574.9 g of ethylene is metered to the reactor. When 50% of the ethylene has been added, 10% of a reducer solution comprising 7.75 g of Bruggolite® FF6 and 3.3 g of anhydrous sodium acetate dissolved in 220.2 g of deionized water is added.

When the reactor temperature and pressure stabilizes, the jacket temperature is set to 40° C., and the additions of the remaining 90% of the reducer solution is commenced at a dosage rate of 132.9 g/hour and an oxidizer solution of 8.4 g of 70% active t-butyl hydroperoxide dissolved in 197.7 g of deionized water is commenced at a dosage rate of 131.6 g/hour. After detection of a temperature increase of 2° C., the jacket temperature is set to 60° C., and the internal reactor temperature is allowed to rise with a set point of 85° C.

When the internal temperature reaches 60° C., the rates of addition of the reducer and oxidizer solutions are reduced to 50% of the initial rates. When the internal temperature reaches 72° C., the slow addition of a further 244.5 g of ethylene commences over 30 minutes at a maximum pressure of 75 bar. When the internal temperature reaches 80° C., the addition of a further 1304 g of vinyl acetate commences over 60 minutes. The rate of addition of the reducer and oxidizer solutions is allowed to vary between 3.3 and 116 g/hour to maintain the polymerization temperature at 85° C.

After the addition of the vinyl acetate is complete, the jacket temperature is reduced to 40-50° C. When the internal temperature can no longer be maintained at 85° C., even with the addition rates of the reducer and oxidizer solutions at 116 g/hour, the reaction is judged complete. The remaining reducer and oxidizer solutions are added at 188 g/hour, and the internal temperature is kept at 85° C. by allowing the jacket temperature to increase. After all additions are complete, the reactor is kept at 85° C. for a further 5 minutes.

The reaction mixture is cooled to 55° C. and transferred to a stripping vessel equipped with a stirrer, (operating at 200 rpm), and vacuum. When 50% has been transferred, a solution comprising 2.27 g of Bruggolite® FF6, 2.43 g of sodium bicarbonate, 0.21 g of ferrous sulphate heptahydrate and 1.8 g of defoamer, (Rhodoline 6575 GM), in 66.1 g of deionized water is added. Once all of the reactor contents are transferred, a solution comprising 4.94 g of 70% active t-butyl hydroperoxide and 2.24 g of 30% active hydrogen peroxide in 44.1 g of deionized water is added, and the stripper is kept at 50° C. for 30 minutes. The stripper contents are cooled to 20° C. and discharged. The resultant dispersion is filtered through a 180µ mesh. The resultant dispersion had a solids content of 55.3%, a viscosity of 2000 mPa·s, pH of 5.1, grit, (measured on a 40µ mesh), of 0.011% and a $T_g$, (onset, by DSC), of 6.2° C.

The solids content, viscosity, pH and onset $T_g$ of the Example 1 dispersion are all set forth in Table 1 hereinafter. These same parameters for the dispersions of the following Examples 2-9 and Comparative Examples 1-6 are also reported in Table 1 hereinafter.

Example 2

To prepare the aqueous dispersion of Example 2, the procedure of Example 1 is followed except that the Orotan 850 ER-LO polyacrylate is omitted.

Example 3

To prepare the aqueous dispersion of Example 3, the procedure of Example 1 is followed except that the levels of the PVOH are changed to 2.5 pphm Celvol 205+1.0 pphm of Celvol 523+0.5 pphm of Celvol 107.

Example 4

To prepare the aqueous dispersion of Example 4, the procedure of Example 1 is followed except that the levels of the PVOH are changed to 2.5 pphm Celvol 205+1.0 pphm of Celvol 523+1.0 pphm of Celvol 107.

Example 5

To prepare the aqueous dispersion of Example 5, the procedure of Example 1 is followed except that the levels of the PVOH are changed to 2.5 pphm Celvol 205+0.5 pphm of Celvol 523+1.0 pphm of Celvol 107.

Example 6

To prepare the aqueous dispersion of Example 6, the procedure of Example 1 is followed except that the levels of the PVOH are changed to 2.2 pphm Celvol 205+0.8 pphm of Celvol 523+1.0 pphm of Celvol 107.

Example 7

To prepare the aqueous dispersion of Example 7, the procedure of Example 6 is followed except that the Orotan 850 ER-LO polyacrylate is omitted.

Example 8

To prepare the aqueous dispersion of Example 8, the procedure of Example 1 is followed except that the levels of the PVOH are changed to 2.0 pphm Celvol 205+1.0 pphm of Celvol 523+1.0 pphm of Celvol 107.

Example 9

To prepare the aqueous dispersion of Example 9, the procedure of Example 8 is followed except that the Orotan 850 ER-LO polyacrylate is omitted.

Comparative Example 1

To prepare the aqueous dispersion of Comparative Example 1, the procedure of Example 1 is followed except that the levels of the PVOH are changed to 3.2 pphm Celvol 205+1.4 pphm of Celvol 523. The redox system is also changed to hydrogen peroxide/sodium formaldehyde sulphoxylate. The level of Orotan 850 ER-LO polyacrylate is also reduced to 0.014 pphm, and 0.43 pphm of a nonionic surfactant, (Disponil A3065), is also incorporated. Further, no fully hydrolyzed PVOH is used.

Comparative Example 2

To prepare the aqueous dispersion of Comparative Example 2, the procedure of Example 1 is followed except that the levels of the PVOH are changed to 3.2 pphm Celvol 205+1.4 pphm of Celvol 523. The redox system is also changed to hydrogen peroxide/sodium formaldehyde sulphoxylate. Further, no fully hydrolyzed PVOH is used.

Comparative Example 3

To prepare the aqueous dispersion of Comparative Example, the procedure of Example 1 is followed except that the levels of the PVOH are changed to 3.2 pphm Celvol 205+1.4 pphm of Celvol 523. The redox system is also changed to hydrogen peroxide/sodium erythorbate. Further, no fully hydrolyzed PVOH is used.

Comparative Example 4

To prepare the aqueous dispersion of Comparative Example 4, the procedure of Example 1 is followed except that the levels of the PVOH are changed to 3.5 pphm Celvol 205+0.5 pphm of Celvol 523, and the Orotan 850 ER-LO polyacrylate is omitted. Further, no fully hydrolyzed PVOH is used.

Comparative Example 5

To prepare the aqueous dispersion of Comparative Example 5, the procedure of Example 1 is followed except that the levels of the PVOH are changed to 3.5 pphm Celvol 205+0.5 pphm of Celvol 523. Further, no fully hydrolyzed PVOH is used.

Comparative Example 6

Comparative Example 6 is a commercially available VA/E dispersion, (Celvolit 149 LV, marketed by Celanese Emulsions, China).

The stabilizing systems of the aqueous dispersions of Examples 1 through 9 and Comparative Examples 1 through 5, and the characteristics of the aqueous dispersions of Examples 1 through 9 and Comparative Examples 1 through 6, are all set forth hereinafter in Table 1.

TABLE 1

| Example | Celvol 205 [pphm] | Celvol 523 [pphm] | Celvol 107 [pphm] | Orotan 850 [pphm] | Disponil A3065 | Solids [%] | Viscosity [mPa · s] | Solids ÷ Ln of Viscosity | Tg [° C.] |
|---|---|---|---|---|---|---|---|---|---|
| 1 | 1.5 | 1.5 | 1.0 | 0.042 | — | 55.3 | 2000 | 7.28 | 6.2 |
| 2 | 1.5 | 1.5 | 1.0 | — | — | 55.2 | 2340 | 7.12 | 6.3 |
| 3 | 2.5 | 1.0 | 0.5 | 0.042 | — | 55.8 | 1420 | 7.69 | 6.4 |
| 4 | 2.5 | 1.0 | 1.0 | 0.042 | — | 55.7 | 1965 | 7.35 | 6.6 |
| 5 | 2.5 | 0.5 | 1.0 | 0.042 | — | 55.6 | 830 | 8.27 | 5.9 |
| 6 | 2.2 | 0.8 | 1.0 | 0.042 | — | 56.3 | 1570 | 7.65 | 6.4 |
| 7 | 2.2 | 0.8 | 1.0 | — | — | 56.1 | 1700 | 7.54 | 6.3 |
| 8 | 2.0 | 1.0 | 1.0 | 0.042 | — | 56.2 | 1780 | 7.51 | 6.2 |
| 9 | 2.0 | 1.0 | 1.0 | — | — | 56.1 | 2000 | 7.38 | 6.2 |
| Comp. 1 | 3.2 | 1.3 | — | 0.014 | 0.43 | 55.5 | 2600 | 7.06 | 5.6 |
| Comp. 2 | 3.2 | 1.3 | — | 0.042 | — | 56.4 | 3260 | 6.97 | 6.3 |
| Comp. 3 | 3.2 | 1.3 | — | 0.042 | — | 56.2 | 2460 | 7.20 | 6.7 |
| Comp. 4 | 3.5 | 0.5 | — | — | — | 56.3 | 2450 | 7.21 | 6.0 |
| Comp. 5 | 3.5 | 0.5 | — | 0.042 | — | 56.4 | 2340 | 7.27 | 6.0 |
| Comp. 6 | — | — | — | — | — | 54.5-56.5 | 1600-2600 | 6.93 to 7.66 | — |

* pphm = parts/hundred total monomer

The aqueous copolymer dispersions of Examples 1 through 9 and Comparative Examples 1 through 6 are tested for formaldehyde content, heat resistance, setting time and yellowing in accordance with the procedures set forth above in the Test Methods section. The results of such testing are set forth hereinafter in Table 2.

TABLE 2

| | Formaldehyde, (ppm) (Method 1) | Formaldehyde, (ppm) (Method 2) | Heat Resistance (° C.) | Setting Time (s) | Yellowing |
|---|---|---|---|---|---|
| Example 1 | 0.1 | 2.3 | 120 | 14 | Better |
| Example 2 | 0.1 | 2.2 | 120 | 14-15 | Better |
| Example 3 | 0.1 | 2.5 | 120 | 14 | Better |
| Example 4 | 0.1 | 2.1 | 120 | 14 | Better |
| Example 5 | 0.1 | 3.1 | 120 | 18-19 | Better |
| Example 6 | 0.1 | 2.2 | 120 | 19 | Better |
| Example 7 | 0.1 | 2.7 | 120 | 18 | Better |
| Example 8 | 0.5 | 2.7 | 120 | 17 | Better |
| Example 9 | 0.1 | 1.1 | 120 | 16-17 | Better |
| Comparative Example 1 | 122 | 109 | 100 | 16 | Better |
| Comparative Example 2 | 175 | 108 | 125 | 16 | Better |
| Comparative Example 3 | 7.0 | 10.6 | 125 | 16 | Worse |
| Comparative Example 4 | 2.0 | 2.0 | 120 | 19 | Equal |
| Comparative Example 5 | 1.0 | 1.7 | 120 | 20 | Better |
| Comparative Example 6 (Celvolit 149 LV) | | ca. 20 | 120 | 20-21 | Standard |

The Table 2 results indicate that the dispersions of Examples 1 to 9 have very low formaldehyde contents and also exhibit desirable heat resistance and setting speed and also have better resistance to yellowing than a commercially available low formaldehyde VAE dispersion. The Table 2 results further show that Comparative Examples 1 and 2, which use sodium formaldehyde sulfoxylate as a reducing agent, have high formaldehyde contents. Comparative Example 3 uses sodium erythorbate as a reducing agent and has a relatively low formaldehyde content but not as low as Examples 1 to 9. Comparative Examples 4 and 5, which utilize the same reducing agent as Examples 1 to 9 but not fully hydrolyzed PVOH, exhibit setting speeds which are generally not as good as those of Examples 1 to 9.

Example 10

Cigarette Sideseaming Adhesive Composition

An adhesive composition is prepared having the following composition and characteristics:

| Component | Parts by Weight |
|---|---|
| Example 1 Dispersion | 88.7 |
| Preservative | 0.1 |
| Defoamer | 0.2 |

-continued

| Component | Parts by Weight |
|---|---|
| PVOH, 25% solids (Celvol 205) | 5.0 |
| Water | 6.0 |
| Total | 100 |

Solids: 48.0%-51.0%
Viscosity: 400-700 mPa·s (BVF 2#/20 rpm/27° C.)

Such an adhesive composition is useful for sealing paper wrapped around a cylindrical tobacco rod forming a seam along the side in order to prepare a cigarette.

Example 11

Cigarette Tipping Glue Composition

An adhesive composition is prepared having the following composition and characteristics:

| Component | Parts by Weight |
|---|---|
| Example 1 Dispersion | 73.7 |
| Preservative | 0.1 |
| Defoamer | 0.2 |
| PVOH, 30% solids (Celvol 205) | 21.0 |
| PVOH, 24% solids (Celvol 418) | 5.0 |
| Total | 100 |

Solids: 46.0-49.0%
Viscosity: 4000-6000 mPa·s (BVF 4#/20 rpm/27° C.)

Such an adhesive composition is useful as a tipping glue for attaching a filter to one end of a paper-wrapped cylindrical tobacco rod in order to prepare a filter cigarette.

While the present development has been described and illustrated by reference to particular embodiments, those of ordinary skill in the art will appreciate that the development lends itself to variations not necessarily illustrated herein.

The invention claimed is:

1. A low-formaldehyde aqueous dispersion of a vinyl ester/ethylene copolymer prepared by emulsion copolymerization of a monomer mixture comprising a vinyl ester, ethylene, a stabilizing system comprising a first polyvinyl alcohol having a degree of hydrolysis of at least 97 mole %, and a second polyvinyl alcohol comprising a blend of two different polyvinyl alcohols, each having a degree of hydrolysis of from about 85 to 90 mole %, and a free radical redox polymerization initiator system which comprises a water-insoluble oxidizing agent and a sulfinic acid-based reducing agent, wherein:
   a) said monomer mixture is substantially free of co-monomers which yield free formaldehyde upon drying or curing of said dispersion and is also substantially free of ethylene oxide-containing emulsifiers;
   b) said dispersion has a solids content of from 54 wt % to 57 wt % and a Brookfield viscosity from 1000 to 5000 mPa·s at 25° C., such that the ratio of solids content to the natural logarithm of viscosity ranges from 6.34 to 8.25 wt %/ln(mPa·s); and
   c) said dispersion has a formaldehyde content of less than 5.0 ppmw as determined by ISO-15173.

2. The dispersion according to claim 1 wherein the water-insoluble oxidizing agent is selected from benzoyl peroxide, lauryl peroxide, t-butyl peroxide, t-butyl hydroperoxide, 2,2'-azobisisobutyronitrile, t-amyl hydroperoxide, t-butyl peroxyneodecanoate, and t-butyl peroxypivalate.

3. The dispersion according to claim 1 wherein the sulfinic acid-based reducing agent is a glycolic acid adduct of a sulfinic acid salt.

4. The dispersion according to claim 1 wherein the reducing agent is a sulfinic acid-based compound selected from 2-hydroxyphenyl hydroxymethyl sulfinic acid-sodium salt; 4-methoxyphenyl hydroxymethyl sulfinic acid-sodium salt; 2-hydroxy-2-sulfinato acetic acid-disodium salt; 2-hydroxy-2-sulfinato acetic acid-zinc salt; 2-hydroxy-2-sulfinato propionate-disodium salt; ethyl 2-hydroxy-2-sulfinato propionate-sodium salt and combinations of said reducing agents.

5. The dispersion according to claim 1 wherein the reducing agent further comprises at least one sulfonic acid compound which corresponds to sulfinic acid-based compound(s) used, with or without the corresponding sulfite also being present as part of the reducing agent.

6. The dispersion according to claim 5 wherein the reducing agent comprises a combination of 2-hydroxy-2-sulfinato acetic acid-disodium salt and 2-hydroxy-2-sulfonato acetic acid-disodium salt, with or without sodium sulfite.

7. The dispersion according to claim 1 wherein the polymerization initiator system further comprises a water-soluble oxidizing agent.

8. The dispersion according to claim 1 wherein the polymerization initiator system further comprises a redox reaction catalyzing salt of a metal selected from iron, copper, manganese, silver, platinum, vanadium, nickel, chromium, palladium, and cobalt, with or without metal complexing agents.

9. The dispersion according to claim 1 wherein at least a portion of the polyvinyl alcohol of the stabilizing system has a degree of hydrolysis of at least 97 mole %.

10. The dispersion according to claim 9 wherein the stabilizing system further comprises hydrolyzed polyvinyl alcohol having a degree of hydrolysis of from 85% to 90 mole %.

11. The dispersion according to claim 10 wherein the polyvinyl alcohol stabilizing system comprises (a) from 0.25 to 3 wt % based on the total monomer weight of a first polyvinyl alcohol component having a degree of hydrolysis of at least 97 mole % and (b) from 1 to 5 wt % based on the total monomer weight of a second polyvinyl alcohol component having a degree of hydrolysis of from 85 to 90 mole %.

12. The dispersion according to claim 11 wherein the second polyvinyl alcohol component comprises a combination of a relatively lower molecular weight polyvinyl alcohol and a relatively higher molecular weight polyvinyl alcohol with the weight ratio of the two polyvinyl alcohols of said second polyvinyl alcohol component being adjusted to give the dispersion a viscosity between 1000 and 5000 mPa·s.

13. The dispersion according to claim 12 wherein the polyvinyl alcohol having a degree of hydrolysis of at least 97 mole % has a Hoppler viscosity at 4% concentration of from 3.0 to 11.0 mPa·s; the first polyvinyl alcohol having a degree of hydrolysis of from 85 to 90 mole % has a Hoppler viscosity at 4% concentration of from 3.0 to 10.0 mPa·s; and the second polyvinyl alcohol having a degree of hydrolysis of from 85 to 90 mole % has a Hoppler viscosity at 4% concentration of from 20 to 36 mPa·s.

14. The dispersion according to claim 1 having an average particle size between 0.5 and 5 μm.

15. The dispersion according to claim 1 wherein the vinyl ester/ethylene copolymer contains from 5 wt % to 25 wt % of units derived from ethylene.

16. The dispersion according to claim 1 wherein the vinyl ester component of the copolymer comprises a vinyl ester of a $C_1$-$C_{13}$ saturated carboxylic acid.

17. An adhesive composition comprising the aqueous dispersion according to claim 1.

18. A cigarette product having its paper sideseam sealed with the adhesive composition according to claim 17.

19. A cigarette product utilizing the adhesive composition according to claim 17 as a tipping glue.

20. The dispersion according to claim 1 having a viscosity of from 1500 to 3000 mPa·s at 25° C. and a solids content of from 54.5 wt % to 56.5 wt %.

21. The dispersion according to claim 2 wherein the water-insoluble oxidizing agent is t-butyl hydroperoxide.

22. The dispersion according to claim 1 wherein the two different polyvinyl alcohols in the blend have different molecular weights.

* * * * *